US009079754B2

(12) United States Patent
Feiquan et al.

(10) Patent No.: US 9,079,754 B2
(45) Date of Patent: *Jul. 14, 2015

(54) POWERED PALLET TRUCK

(71) Applicant: BIG LIFT, LLC, Lombard, IL (US)

(72) Inventors: Meng Feiquan, Hangzhou (CN); Liu Yuanwei, Hangzhou (CN); Jinhui He, Hangzhou (CN)

(73) Assignee: BIG LIFT, LLC, Lombard, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,180

(22) Filed: Aug. 7, 2014

(65) Prior Publication Data

US 2014/0353562 A1 Dec. 4, 2014

Related U.S. Application Data

(63) Continuation of application No. 13/949,453, filed on Jul. 24, 2013, now Pat. No. 8,833,736, which is a continuation of application No. 13/363,247, filed on Jan. 31, 2012, now Pat. No. 8,540,213.

(51) Int. Cl.

| | |
|---|---|
| ***B62B 3/06*** | (2006.01) |
| ***B66F 9/065*** | (2006.01) |
| ***B66F 9/22*** | (2006.01) |
| ***B66F 9/075*** | (2006.01) |
| *B66F 9/18* | (2006.01) |
| *B66F 9/14* | (2006.01) |
| *B66F 9/12* | (2006.01) |
| *B66F 9/08* | (2006.01) |

(52) U.S. Cl.

CPC ............ *B66F 9/065* (2013.01); *B66F 9/07513* (2013.01); *B66F 9/22* (2013.01); *B66F 9/085* (2013.01); *B66F 9/12* (2013.01); *B66F 9/145* (2013.01); *B66F 9/186* (2013.01)

(58) Field of Classification Search

USPC ........................................................ 254/2 R

See application file for complete search history.

(56) References Cited

U.S. PATENT DOCUMENTS

| | | | | | |
|---|---|---|---|---|---|
| 2,592,091 | A | | 4/1952 | Weaver | |
| 2,643,740 | A | * | 6/1953 | Quayle | 187/231 |
| 2,840,175 | A | * | 6/1958 | Ulinski | 180/19.2 |
| 3,043,388 | A | | 7/1962 | Hansen | |
| 3,068,019 | A | * | 12/1962 | Ulinski | 280/103 |
| 3,187,917 | A | | 6/1965 | Miller | |
| 3,202,233 | A | * | 8/1965 | Goodacre et al. | 180/13 |
| 3,249,170 | A | | 5/1966 | Quayle | |
| 3,295,881 | A | | 1/1967 | Worthington | |
| 3,601,423 | A | | 8/1971 | Goodacre | |

(Continued)

OTHER PUBLICATIONS

Brochure for "PDS Power Drive Straddle Trucks" issued by Blue Giant®, Sep. 1, 2010 (2 pages).

(Continued)

*Primary Examiner* — Lee D Wilson
*Assistant Examiner* — Alvin Grant
(74) *Attorney, Agent, or Firm* — Cook Alex Ltd.

(57) ABSTRACT

A powered pallet truck is provided having a frame assembly that includes a base support portion and a load lift portion. The base support portion includes a lift cylinder device seat spaced from and above a steering seat, and the load lift portion includes a pair of forks which extend forwardly of the base support portion. The powered pallet truck has a lift cylinder device connected to the load lift portion and to the base support portion.

24 Claims, 17 Drawing Sheets

(56) References Cited

U.S. PATENT DOCUMENTS

| | | | | |
|---|---|---|---|---|
| 3,854,748 | A | 12/1974 | Goodacre | |
| 4,047,698 | A | 9/1977 | Ellis | |
| 4,065,012 | A | 12/1977 | Rocco | |
| 4,082,195 | A | 4/1978 | Wnek | |
| 4,096,961 | A | 6/1978 | Rocco | |
| 4,103,795 | A | 8/1978 | Miller | |
| 4,287,959 | A * | 9/1981 | Inman | 180/12 |
| 4,470,578 | A | 9/1984 | Arvidsson et al. | |
| 4,577,463 | A | 3/1986 | Kedem | |
| 4,615,533 | A | 10/1986 | Sewell | |
| 4,941,794 | A | 7/1990 | Hara et al. | |
| 5,113,960 | A | 5/1992 | Prinz | |
| 5,326,217 | A | 7/1994 | Simpson et al. | |
| 5,618,154 | A | 4/1997 | Irons et al. | |
| 5,752,584 | A | 5/1998 | Magoto et al. | |
| 6,027,303 | A | 2/2000 | Voegeli | |
| 6,125,971 | A | 10/2000 | Niebuhr et al. | |
| 6,260,646 | B1 | 7/2001 | Fernandez et al. | |
| D447,612 | S | 9/2001 | Niebuhr | |
| 7,040,427 | B2 | 5/2006 | Toomey | |
| D530,878 | S | 10/2006 | Ruppert et al. | |
| D583,124 | S | 12/2008 | Stark | |
| 7,744,335 | B1 | 6/2010 | Cleary | |
| 8,230,976 | B2 | 7/2012 | Baldini | |
| 8,246,008 | B2 | 8/2012 | De Jong et al. | |
| 8,306,703 | B1 | 11/2012 | Saleh | |
| 8,360,443 | B2 | 1/2013 | Ellington | |
| 8,540,213 | B2 * | 9/2013 | Feiquan et al. | 254/2 R |
| 8,833,736 | B2 * | 9/2014 | Feiquan et al. | 254/2 R |
| 2005/0036880 | A1 | 2/2005 | Magoto et al. | |
| 2006/0181039 | A1 | 8/2006 | Fridlington, Jr. | |
| 2009/0260923 | A1 | 10/2009 | Baldini | |

OTHER PUBLICATIONS

Website for Shanghai Noblelift Co. Ltd. Guangzhou Subsidiary "Semi-electric Pallet Truck Spt" http:/gdnobliften.en.busytrade.com/products/info/1904267/Semi-electric-Pallet-Truck-Spt.html, accessed Jan. 13, 2012, (4 pages).

Website for Stars for "Electric Vehicle—Electric Pallet Truck," http://www.starstw.com/news/stars-electric-pallet-truck.html, accessed Jan. 13, 2012 (1 page).

Website for Cherry's Industrial Equipment for "SPT15-Semi Electric Pallet Truck" http:/www.pallettruck.com/spt15.html, accessed Jan. 17, 2012 (1 Page).

Brochure for "Walkie Pallet Trucks 4,000—5,000 lbs.", Model MPB040-E issued by Yale Materials Handling Corporation, 2006, (14 pages).

Three (3) color Photographs of the "Walkie Pallet Trucks 4,000—5,000 lbs.", Model MPB040-E by Yale Materials Handling Corporation.

* cited by examiner

POWERED PALLET TRUCK

CROSS-REFERENCE To RELATED APPLICATION

This application is a continuation of co-pending U.S. patent application Ser. No. 13/949,453, filed Jul. 24, 2013, which is a continuation of U.S. patent application Ser. No. 13/363,247, filed Jan. 31, 2012, which issued as U.S. Pat. No. 8,540,213 on Sep. 24, 2013, and claims priority to Chinese Patent Application No. 201110420520.4, filed Dec. 16, 2011, wherein the entire disclosures of these related applications are hereby incorporated by reference in their entirety.

FIELD OF THE INVENTION

The invention relates to industrial lift trucks and, in particular, pallet trucks for lifting and transporting pallets upon which goods may be placed.

BACKGROUND OF THE INVENTION

Pallet trucks are often used to lift and maneuver pallets and goods supported thereon during warehousing and shipping. Pallet trucks have been developed to provide varying amounts of functionality to an operator and may be generally categorized as either manual or powered. Manual pallet trucks typically have a frame with forks connected thereto, a truck supported on a pair of rear wheels, and a hydraulic jack connected to the truck and the frame. The jack, which is typically a hydraulic bottle jack, is operated by pivotally pumping a steering handle of the pallet truck up and down which causes the hydraulic bottle jack to raise the frame and the forks thereof off of the ground. Once the pallet has been raised by pumping the handle, an operator may steer the pallet truck by turning the handle relative to the truck. The handle is connected to the hydraulic bottle jack and the pair of rear wheels such that turning the handle generates concurrent turning of the hydraulic bottle jack and the pair of rear wheels. With the pallet raised, the operator pushes or pulls on the handle with sufficient force to maneuver the pallet truck, the pallet, and the goods on the pallet to a desired location. As is apparent, maneuvering the pallet truck, the elevated pallet, and the goods thereon is even more difficult when the pallet truck is positioned on an inclined surface or within relatively tight confines, such as offloading pallets from a semi-truck trailer.

A powered pallet truck has a frame with forks connected thereto, a truck supported on a rear wheel, a hydraulic jack connected to the truck and the frame, and a drive mechanism connected to the rear wheel that assists the operator in maneuvering the pallet truck. Like the manual pallet truck, the powered pallet truck has a handle connected to the hydraulic jack and the rear wheel such that turning of the handle generates concurrent turning of the hydraulic jack and the drive wheel. However, the powered pallet truck has a drive mechanism, such as an electric motor, connected to the rear wheel that allows an operator to propel and brake the pallet truck by way of controls on the handle. This type of pallet truck may be referred to as a semi-powered pallet truck, as the operator still pivotally pumps the handle to activate the hydraulic jack and raise the frame and the forks thereof off the ground. An operator, such as an employee of a local delivery service, may make a large number of deliveries throughout a workday that each involve loading and unloading pallets and the goods thereon. Requiring the operator to manually pump the handle of the pallet truck each time they need to lift a pallet may be ergonomically difficult, particularly when the operator is attempting to move a pallet in limited working areas.

It is therefore desirable in some applications to provide a pallet truck having both a powered drive mechanism and a powered lift mechanism. Prior approaches for this type of pallet truck, which may be referred to as a fully-powered pallet truck, utilize a frame assembly comprising a large front frame having a pair of forks that moves up and down and a large rear frame to which the drive mechanism and lift mechanism are mounted that remains relatively stationary during up and down movement of the front frame. For many prior fully-powered pallet trucks, the drive mechanism comprises an electric drive motor for propelling the pallet truck and the lift mechanism comprises a hydraulic pump and a hydraulic cylinder for moving the front frame up and down relative to the rear frame. By mounting the electric motor, the hydraulic pump, and the hydraulic cylinder to the generally stationary rear frame, wear and tear on the wiring and hoses associated with these components is limited during up and down movement of the front frame and forks thereof. One problem with this type of pallet truck is that the rear frame needs to be relatively large to support the drive mechanism, the lift mechanism, and their associated wiring, hoses, fittings, and the like. Further, because the length of the forks of the pallet truck are generally fixed according to industry standards, providing a sufficiently large rear frame to support the drive mechanism, lift mechanism, and their associated components increases the overall length of the pallet truck and inhibits maneuverability of the pallet truck in tight operating spaces.

Another problem with prior fully-powered pallet trucks is that the configuration of the drive and lift mechanisms adds length to the rear frame and increases the overall length of the pallet truck. More specifically, the drive mechanism of the pallet truck comprises a drive motor mounted vertically or horizontally on the rear frame and the lift mechanism comprises one or more hydraulic cylinders mounted to the rear frame forward of the drive motor that are configured to raise and lower the front frame. Positioning the one or more hydraulic cylinders forward of the drive motor further increases the length of the rear frame which, in turn, increases the overall length of the pallet truck and further inhibits its maneuverability.

Yet another shortcoming with prior fully-powered pallet trucks is that a lower portion of the rear frame needs to be sufficiently strong to support the weight and loading applied by the drive and lift mechanisms. In addition, prior fully-powered pallet trucks have a two-bar linkage between upper portions of the front and rear frames to control relative movement therebetween. The rear frame therefore needs to be sufficiently strong at the lower portion thereof to support the weight and loading applied by the drive and lift mechanisms in addition to being sufficiently strong at the upper portion thereof to support the loading applied to the two bar linkage from the front frame, pallet, and goods on the pallet. This large, strong rear frame is expensive to manufacture, increases the weight of the pallet truck, and decreases the efficiency of the pallet truck due to the increased power necessary to propel the heavier pallet truck.

SUMMARY OF THE INVENTION

In accordance with one aspect of the invention, a powered pallet truck is provided having a frame assembly including a base support portion, a load lift portion having a pair of forks, and a central longitudinal axis extending in a fore-and-aft direction with the forks of the load lift portion extending forwardly on either side of the central longitudinal axis. The pallet truck has a drive wheel disposed below the base support portion, a drive motor mounted in the drive wheel, and an overall longitudinal length extending in the fore-and-aft direction from distal ends of the forks to the center of the drive wheel. The pallet truck further includes a lift mechanism operable for moving the load lift portion of the frame assembly up and down mounted to extend upwardly in general fore-and-aft alignment with the center of the drive wheel. Having the drive motor mounted in the drive wheel and the lift mechanism mounted in fore-and-aft alignment with the center of the drive wheel provides both a drive mechanism and a lift mechanism in a smaller envelope than previous fully-powered pallet trucks. Further, mounting the drive motor in the drive wheel provides a powered drive mechanism for the pallet truck without having the base support portion of the frame assembly be sufficiently large to accommodate the drive motor thereon.

The pallet truck further includes a pressurized fluid supply mechanism mounted to the load lift portion of the frame assembly forward of the lift mechanism along the central longitudinal axis which is configured to supply pressurized fluid to the lift mechanism through a fluid conduit. In contrast to prior fully-powered pallet trucks having a hydraulic pump mounted on a large stationary rear frame, the pressurized fluid supply mechanism of the subject pallet truck is mounted to the load lift portion of the frame which moves up and down relative to the base support portion of the frame assembly. While this approach runs counter to the approach taken in prior fully-powered pallet trucks, it increases utility of the load lift portion of the frame assembly by using the load lift portion to support the pressurized fluid supply mechanism. In one form, the pressurized fluid supply mechanism, one or more batteries, and a controller of the pallet truck are all mounted to the load lift portion of the frame assembly which provides a compact and lightweight configuration for the fluid supply and electrical systems of the pallet truck. Further, mounting the pressurized fluid supply mechanism to the load lift portion of the frame assembly forward of the lift mechanism provides a powered lift mechanism for the pallet truck without requiring that the base support portion of the frame assembly be sufficiently large to accommodate the pressurized fluid supply mechanism thereon. In this manner, the mounting of the drive motor, the lift mechanism, and the pressurized fluid supply mechanism keeps the overall longitudinal length of the pallet truck to a minimum, such as approximately 54 inches.

The load lift portion of the frame may have an upstanding housing portion configured to receive one or more batteries with the fluid supply mechanism mounted to the upstanding housing portion above the one or more batteries. In one form, the fluid supply mechanism includes a hydraulic pump and reservoir both mounted to the upstanding housing portion in a horizontal orientation above the batteries. With the drive motor mounted in the wheel and the one or more batteries are disposed upon a bottom wall of the housing portion, the drive motor, hydraulic pump, reservoir, and one or more batteries are configured to lower the center of gravity of the pallet truck and increase the stability thereof during use.

In a preferred form, the pressurized fluid supply mechanism includes a pump and the frame assembly includes a rearward power head to which the forks are connected and the pump is mounted. The power head has a longitudinal length and the forks have a standard length, with the power head being configured so that the mounting of the drive motor, lift mechanism, and the pump keeps the longitudinal length of the power head to a minimum. In one approach, the power head includes a steering seat to which a steering assembly is mounted, a drive wheel below the steering seat to which the drive motor is mounted, and a pump mount forward longitudinally of the steering mount. The rearward power head further includes a mounting portion to which the lift mechanism is mounted with the connection of the lift mechanism to the power head keeping the longitudinal length of the power head to a minimum. For example, the power head includes a lift mechanism seat to which the lift mechanism is mounted above the steering seat. By minimizing the longitudinal length of the power head, the pallet truck provides easier maneuverability in tight working areas for a given length of the forks.

In accordance with another form of the invention, a powered pallet truck is provided that includes a frame assembly having a base support portion and a load lift portion with a pair of forks extending forwardly of the base support portion in a longitudinal direction. The base support portion includes a steering seat and a lift cylinder device seat separate from the steering seat. The pallet truck includes a steering assembly rotatably coupled to the steering seat and a lift cylinder device operable to move the load lift portion up and down relative to the base support portion. The pallet truck has a pivot connection between an upper end portion of the lift cylinder device and the load lift portion that permits movement of the upper end portion relative to the load lift portion with up and down movement of the load lift portion and the forks thereof. Further, the pallet truck has a connection between a lower end portion of the lift cylinder device and the lift cylinder device seat of the base support portion configured so that the lower end portion and the lift cylinder device seat are fixed against longitudinal movement relative to each other.

The pallet truck further includes a fluid conduit between the lift cylinder device and a pressurized fluid supply mechanism mounted to the load lift portion. The fluid conduit is connected to the upper portion of the lift cylinder device adjacent the pivot connection between the upper portion of the lift cylinder device and the load lift portion of the frame assembly. This configuration limits movement of the fluid conduit during up and down movement of the load lift portion of the frame assembly and the associated pivoting of the upper portion of the lift cylinder device relative to the load lift portion. More specifically, by having separate steering and lift cylinder device seats, the lift cylinder device is not turned each time an operator turns the steering assembly to maneuver the pallet truck which keeps the lift cylinder from turning relative to the fluid conduit and imparting stresses thereto. Further, connecting the fluid conduit to the upper portion of the cylinder adjacent the pivot connection minimizes the change in vertical position of the fluid conduit as the load lift portion moves up and down. Still further, by fixing the lower end portion of the lift cylinder device against longitudinal movement relative to the lift cylinder device seat, horizontal movement of the lift cylinder relative to the pressurized fluid supply device mounted on the load lift portion is minimized during up and down movement of the load lift portion. In this manner, the stresses imparted to the fluid conduit and the connections between the fluid conduit and the lift cylinder and pressurized fluid supply device are reduced and prolongs the lifecycle of the lift cylinder device, fluid conduit, and pressurized fluid supply mechanism.

In one form, the upper end portion of the lift cylinder device includes a housing having a closed upper end and a lower end opening and the lower end portion of the lift cylinder device includes a piston which reciprocates into and out of the lower end opening of the housing during operation of the lift cylinder device. By utilizing a housing having a closed upper end, the fluid conduit can be connected to the closed upper end which minimizes the distance the fluid conduit needs to extend along the lift cylinder device to supply fluid to the lift cylinder device. As is apparent, the orientation of the lift cylinder device is inverted compared to the hydraulic cylinders of prior fully-powered pallet trucks and provides a powered lift mechanism without having the base support portion be sufficiently large to accommodate the housing and the fluid conduit connected thereto.

In another aspect of the present invention, a powered pallet truck is provided that includes a frame assembly having a base support portion and a load lift portion with a pair of forks. The pallet truck has a steering assembly rotatably coupled to the base support portion, a control head of the steering assembly for receiving manual inputs from an operator, and one or more cables operably connecting the control head to a controller mounted to the load lift portion of the frame assembly. The base support portion includes an arcuate window sized and configured to receive the one or more cables extending therethrough with the arcuate window permitting movement of the one or more cables within the window as the steering assembly is turned relative to the base support portion. The arcuate window permits the one or more cables to move with turning of the steering assembly without flexing or pinching of the one or more cables due to engagement with the base support portion. Further, the arcuate window provides a range of motion for the one or more cables for the full range of turning of the steering assembly, e.g., 180 degrees, without bending or wrapping the one or more cables around surfaces of the base support portion of the frame assembly.

The base support portion of the frame assembly may include a steering mounting portion disposed below the arcuate window to which the steering assembly is rotatably coupled, a lift mechanism mounting portion disposed above the arcuate window, and a lift mechanism connected to the lift mechanism mounting portion. The steering mounting portion and the lift mechanism mounting portion are disposed on opposite sides of the arcuate window such that the one or more cables can move within the arcuate window without being restricted by the steering assembly or the lift mechanism. Further, the vertically stacked configuration of the steering mounting portion, arcuate window, and lift mechanism mounting portion provides a powered pallet truck having a drive mechanism and a lift mechanism in a compact assembly.

DETAILED DESCRIPTION OF THE PREFERRED EMBODIMENTS

Figure 1:
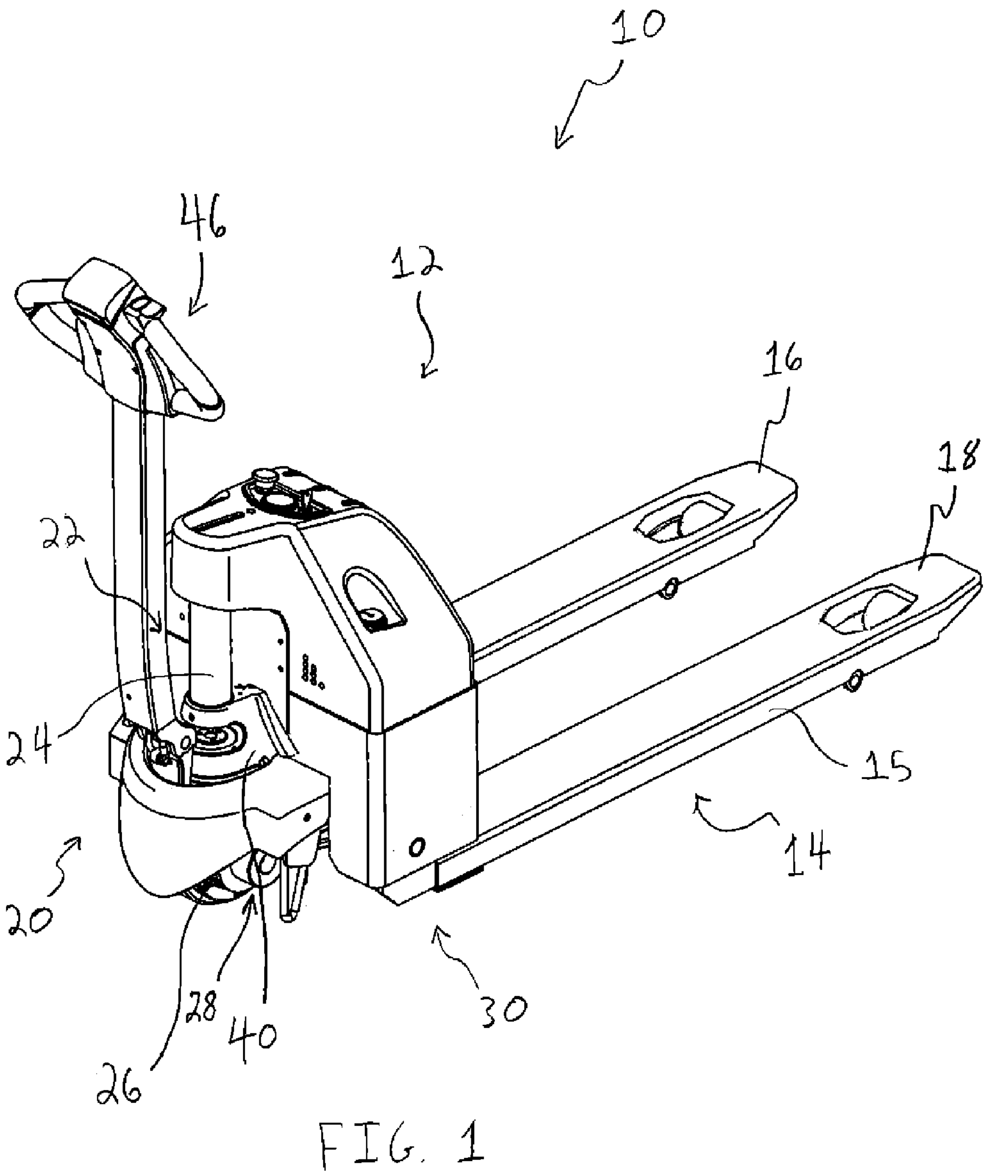
FIG. 1 is a perspective view of a powered pallet truck in accordance with the present invention.

In FIG. 1, a pallet truck 10 in accordance with the present invention is illustrated. The pallet truck 10 has a frame assembly 12 with a load lift portion 14, such as a load lift frame 15, and forks 16, 18 thereof which moves up and down relative to a base support portion 20 to lift pallets and goods positioned thereon. The pallet truck 10 has a lift mechanism 22, such as a lift cylinder device 24, positioned directly above a drive wheel 26 and a drive motor 28 (see FIG. 9) of the pallet truck 10. The pallet truck 10 has a power head 30 extending rearward from the forks 16, 18, which includes lift cylinder device 24, drive wheel 26, and the drive motor 28. As shown in FIG. 1, the orientation of the lift cylinder device 24 positioned directly above the drive wheel 26 and drive motor 28 therein minimizes the size of the power head 30 and improves maneuverability of the pallet truck 10 in tight confines, such as unloading pallets from a semi-truck trailer.

Figure 2:
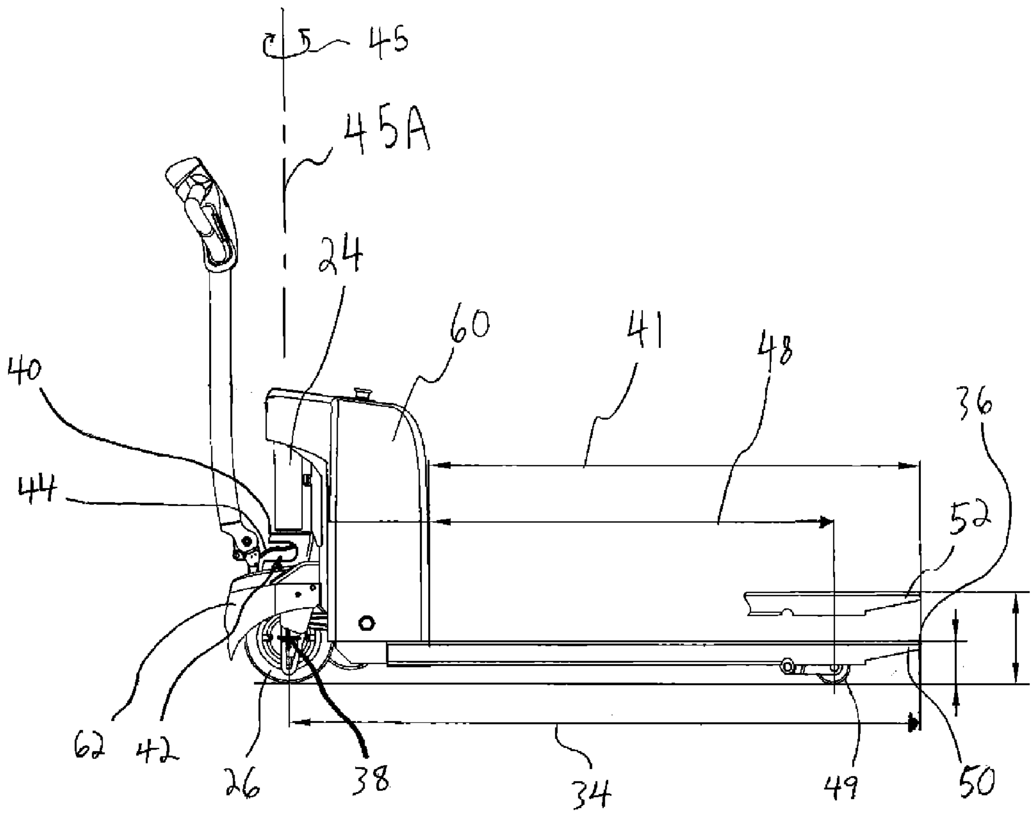
FIG. 2 is a side elevational view of the pallet truck of FIG. 1 showing forks of the pallet truck in a lowered position and portions of the forks when the forks are in a raised position.
Figure 3:
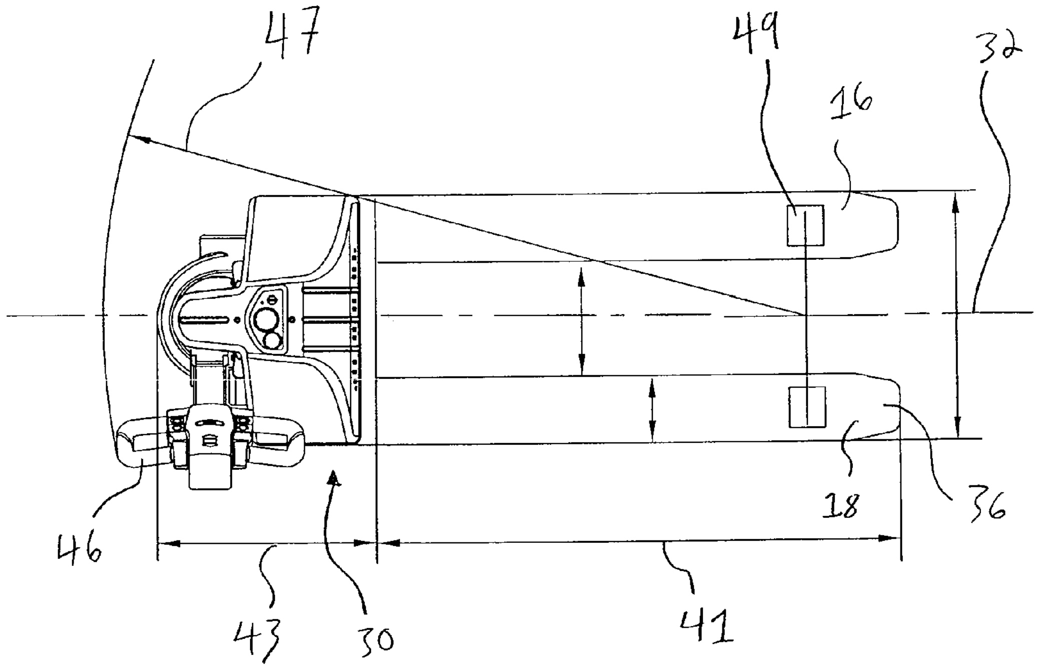
FIG. 3 is a top plan view of the pallet truck of FIG. 1 showing a central longitudinal axis of the pallet truck and a steering assembly of the pallet truck turned all the way to the right.

More specifically, the pallet truck 10 has a central longitudinal axis 32 and an overall longitudinal length 34 extending along the longitudinal axis 32 between distal ends 36 of the forks 16, 18 and a center 38 of the drive wheel 26, as shown in FIGS. 2 and 3. The overall longitudinal length 34 may be in the range of approximately 50 inches to approximately 60 inches, preferably approximately 54 inches. In one form, the base support portion 20 is a cast, integral yoke 40 to which the lift cylinder device 24 is rigidly mounted in fore-and-aft longitudinal alignment with the center 38 of drive wheel 26 and an axis of rotation 37 thereof. The pallet truck 10 has a pressurized fluid supply mechanism 70 (see FIG. 4) that operates the lift cylinder device 24 and moves the lift frame 15 and forks 16, 18 thereof between a lowered position 50 and a raised position 52, indicated in FIG. 2. The pressurized fluid supply mechanism 70 is mounted to the load lift frame 15 forward of the lift cylinder device 24 such that the longitudinal length of the yoke 40 can be minimized. The forks 16, 18 may have a length 41 that is standard to particular applications or industries, such as in the range of approximately 40 inches to approximately 50 inches, preferably 45 inches, and a distance 48 between a center of load rollers 49 and the power head 30 in the range of 36 inches to 44 inches, preferably 40 inches. When utilizing forks 16, 18 of a given longitudinal length 41 and distance 48, minimizing the length of the yoke 40 along the central longitudinal axis 32 minimizes a longitudinal length 43 of the rearward power head 30. Further, a turning radius 47 of the pallet truck 10 can also be minimized for forks 16, 18 of a given length 41 and distance 48 between the power head 30 and load rollers 49.

Figure 4:
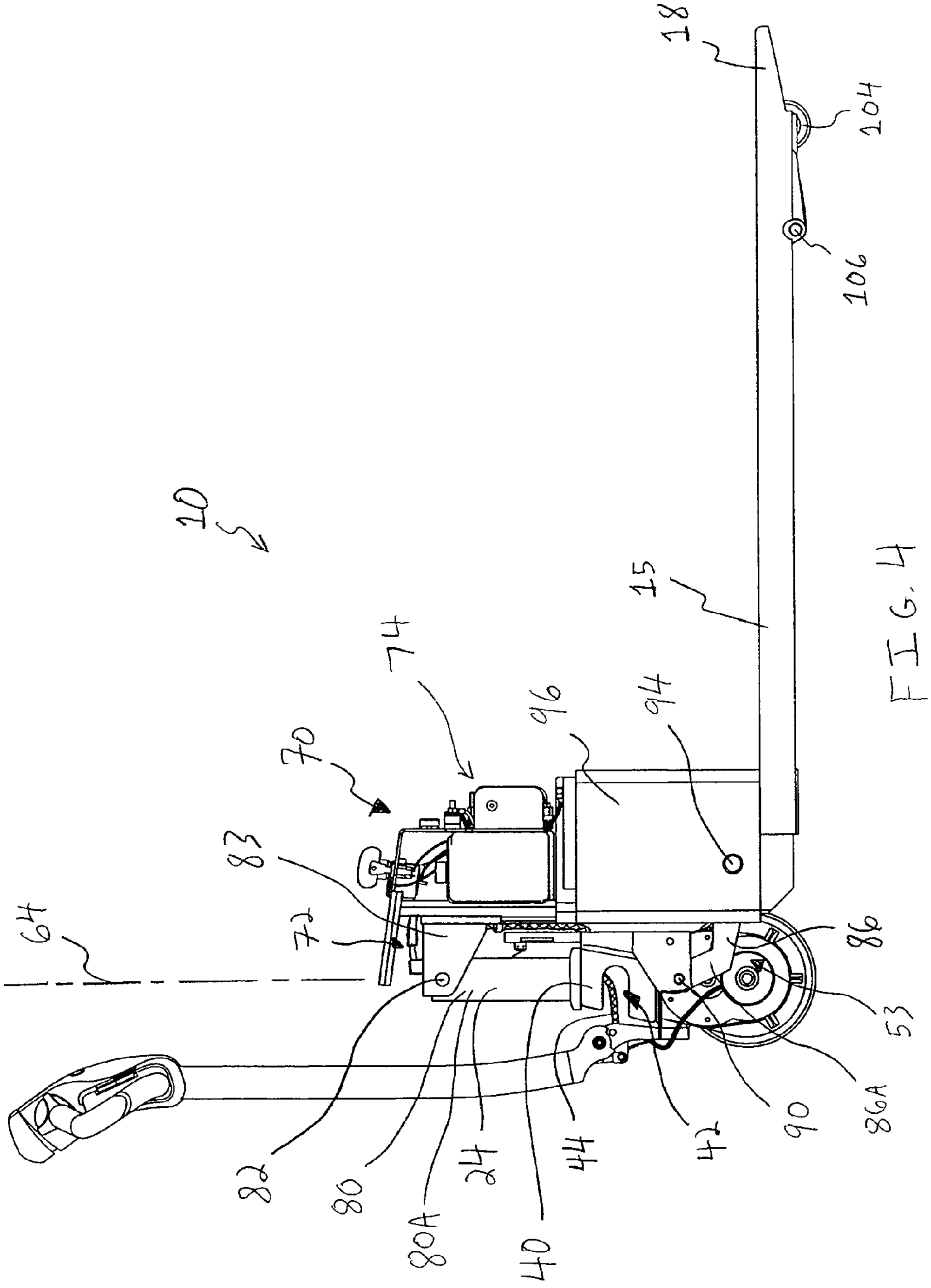
FIG. 4 is a side elevational view of the pallet truck of FIG. 1 with a front cover and a rear cover of the pallet truck removed to show a lift frame of the pallet truck having the forks thereon, a lift cylinder device pivotally connected at an upper portion thereof to the lift frame, and a yoke connected to a lower portion of the lift cylinder device.
Figure 14:
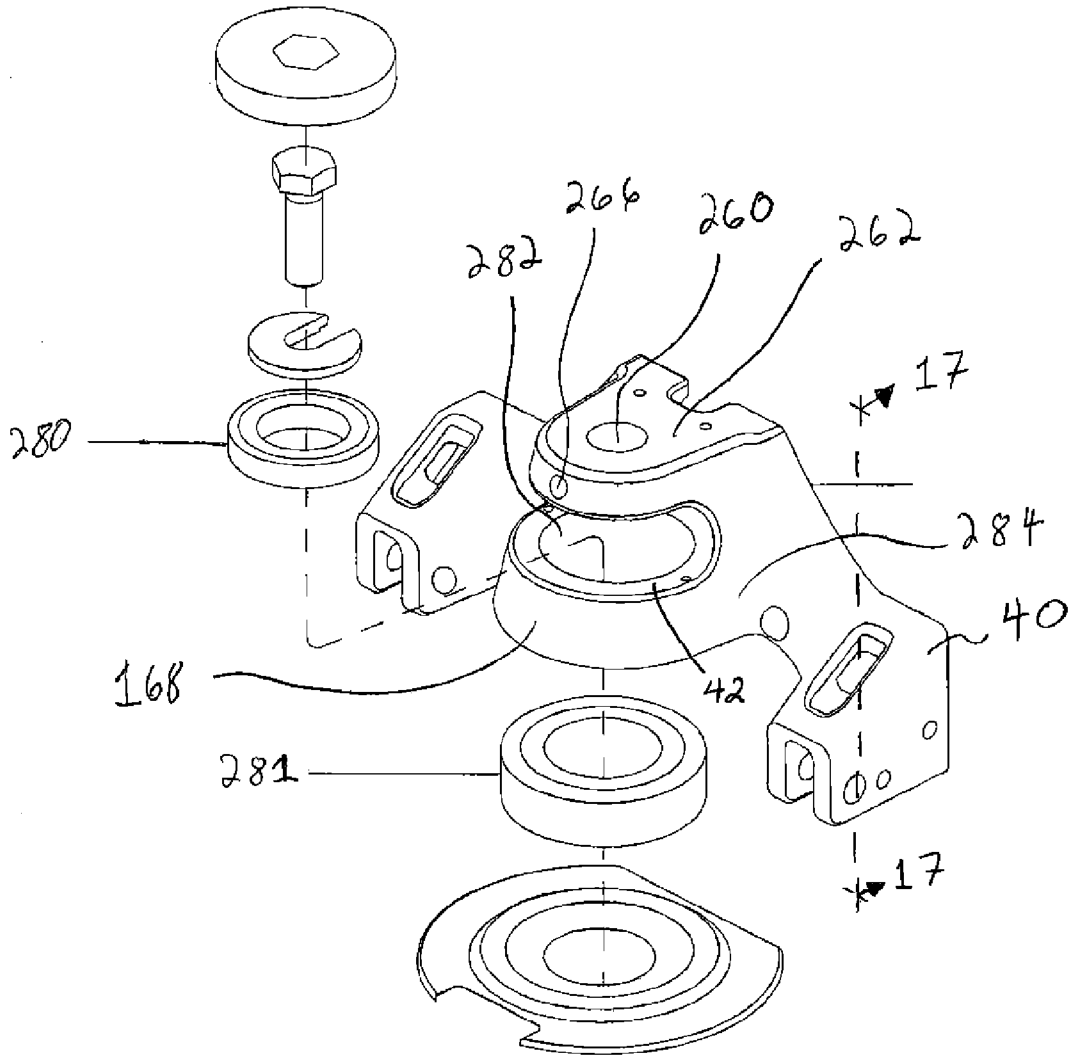
FIG. 14 is an exploded view of the yoke and a portion of the steering assembly of the pallet truck of FIG. 1 showing an arcuate window of the yoke.

The pallet truck 10 further has a steering assembly 46 rotatably coupled to the yoke 40 and may be turned in direction 45 about a steering axis 45A. The yoke 40 has a steering seat 262 and a separate lift cylinder device seat 284 (see FIG. 14) that provides a support for the lift cylinder device 24 independent of the steering assembly 46. In this manner, turning of the steering assembly 46 does not produce concurrent turning of the lift cylinder device 24, contrary to the approach of prior manual and semi-powered pallet trucks. Further, the lift cylinder device 24 has an upper portion 80A pivotally connected to the lift frame 15 and a lower portion 79A connected to the lift cylinder device seat 284, as seen in FIGS. 4, 5 and 14. The connection between the lower portion 79A and the lift cylinder device seat 284 is configured so that the lower portion 79A and the seat 284 are fixed against movement along central longitudinal axis 32 relative to each other. The lower portion 79A may be rigidly fixed to the seat 284 as discussed in greater detail below. In an alternative approach, the lower portion 79A may be connected to the seat 284 with a ball and socket joint that permits turning of the lower portion 79A but still restricts longitudinal relative movement. As seen in FIG. 4, the pallet truck 10 may further include a fluid conduit 72 connected to the upper portion 80A adjacent a pivot joint 82 between the upper portion 80A and the lift frame 15. Although the pivot joint 82 is illustrated generally as a pin joint between the upper portion 80A and the lift frame 15, the pivot joint 82 could take other forms, such as a ball and socket joint. By restricting longitudinal movement of the lower portion 79A, the change in horizontal position of the fluid conduit 72 with up and down movement of the lift frame 15 is reduced which reduces tensioning and other stresses on the fluid conduit 72 and its connection to the lift cylinder 24. Further, by connecting the fluid conduit 72 to the upper portion 80A of the lift cylinder device 24, the change in vertical position of the fluid conduit 72 with up and down movement of the lift frame 15 is reduced which reduces stresses on the fluid conduit 72 and its connection to the lift cylinder 24.

Figure 9:
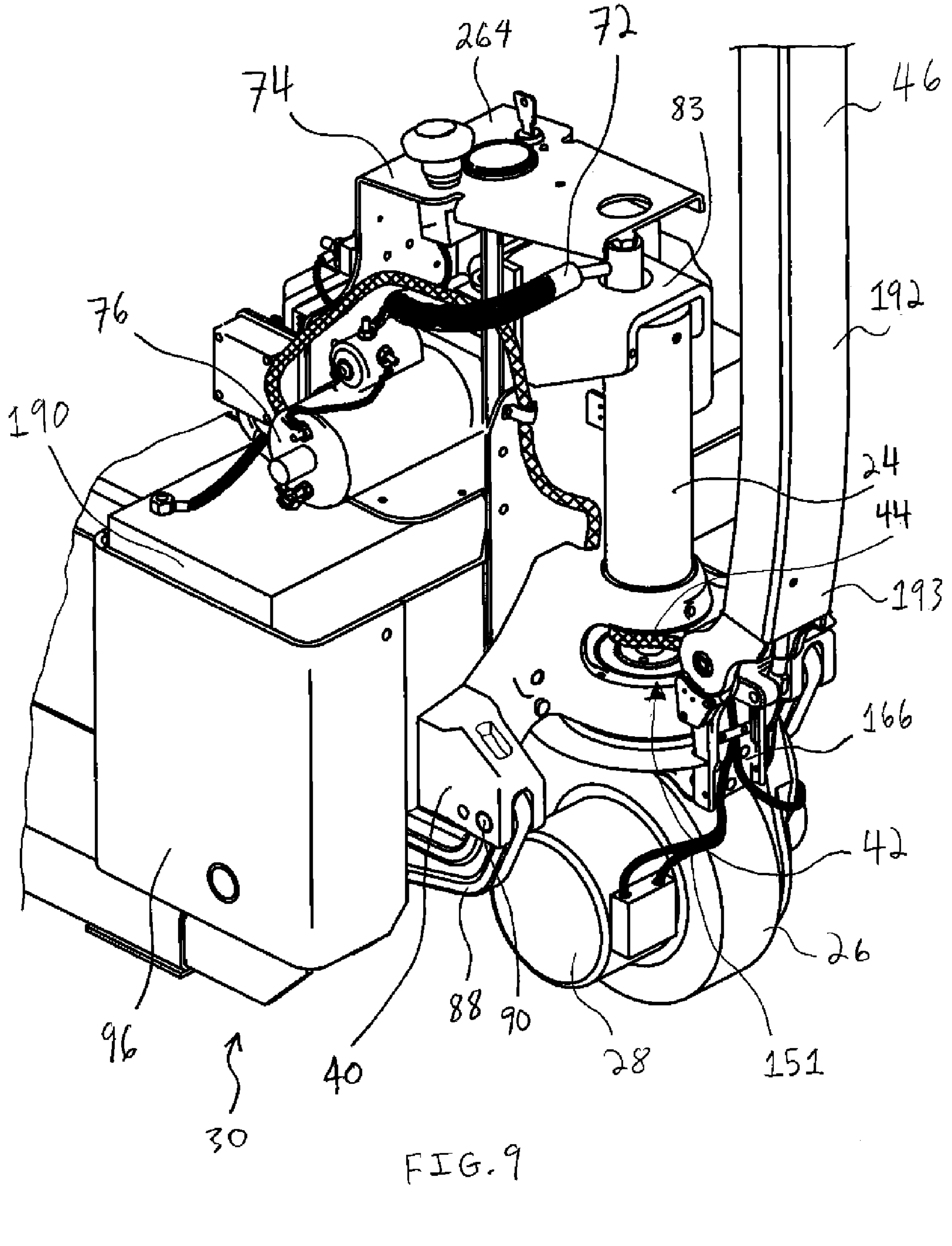
FIG. 9 is a partial perspective view of the pallet truck of FIG. 1 with the front and rear covers removed showing a drive motor positioned within a drive wheel below the lift cylinder device.

In another aspect, as seen in FIG. 9, the yoke 40 has an arcuate window 42 disposed below the lift cylinder device 24 for routing of a wiring harness 44 that extends from a steering assembly 46 into the arcuate window 42 and toward the lift frame 15. Because an operator turns the steering assembly 46 to produce turning of the drive wheel 26, the wiring harness 44 moves within the arcuate window 42 with turning of the steering assembly 46. The arcuate window 42 permits movement of the wiring harness 44 without flexing or kinking of the wiring harness throughout a full range of movement of the steering assembly 46.

With reference to FIGS. 2 and 4-6A, the pallet truck 10 has a front housing 60 and a rear housing 62 that may be removed to illustrate operation of components of the pallet truck 10 as the forks 16, 18 are moved from the lowered position 50 to the raised position 52. The lift cylinder device 24 has a longitudinal axis 64 extending vertically when the forks 16, 18 are in the lowered position 50 and which angles forward as the forks 16, 18 reach the raised position 52 (see FIG. 6). In the illustrated embodiment, the longitudinal axis 64 of the lift cylinder device 24 is aligned with the central longitudinal axis 32 of the pallet truck 10, although alternative positions of the lift cylinder device 24 can readily be appreciated. As can be seen from FIGS. 4, 5, 6, activation of the lift cylinder device 24 raises the lift frame 15 in an arc of movement 120. As the lift frame 15 travels upward, the yoke 40 and the lift cylinder device 24 lean forward which angles the longitudinal axis 64 of lift cylinder device 24 forward as well.

The pressurized fluid supply mechanism 70 is operably coupled to the lift cylinder device 24 via the fluid conduit 72 extending between lift frame 15 and the lift cylinder device 24. In one form, the pressurized fluid supply mechanism 70 includes a hydraulic system assembly 74 having a hydraulic pump 76 (see FIG. 9) and the fluid conduit 72 includes a hose 78 (see FIG. 13). Providing pressurized fluid to the lift cylinder device 24 shifts a piston 79 of the lift cylinder device 24 outward from the housing 80, as shown in FIGS. 5 and 6. The piston 79 is rigidly connected to the yoke 40 such that shifting the piston 79 outward from the housing 80 shifts the housing 80 upward away from the yoke 40. At the upper end of the housing 80, the pivot joint 82 connects the housing 80 and an angle bracket 83 of the lift frame 15. The pivot joint 82 permits the housing 80 to pivot relative to the lift frame 15 as the housing 80 shifts the angle bracket 83 upward away from the yoke 40. In an alternative approach, the lift cylinder 24 may have a rigid connection to the angle bracket 83 and a pivot connection to the yoke 40, such as with a ball-and-socket connection.

The pallet truck 10 has a link mechanism 53 pivotally connected to the yoke 40 and the lift frame 15 for controlling movement of the lift frame 15 along the arc of movement 120. In the illustrated embodiment, the link mechanism 53 includes a pair of arms 86A, 88A of bell cranks 86, 88 disposed on opposite sides of the yoke 40. The arms 86A, 88A are pivotally connected to the yoke 40 at pin joints 90 and are pivotally connected to the lift frame 15 as will be discussed in greater detail below. The lift mechanism 53 further includes the pivot joint 82 between the angle bracket 83 of the lift frame 15 and the lift cylinder device housing 80 which permits the lift cylinder device housing 80 to articulate relative to the lift frame 15 as the lift frame 15 raises and lowers. In this manner, the link mechanism 53 provides a pantograph-style elevation mechanism for the lift frame 15 and controls the movement thereof relative to the yoke 40. Further, the link mechanism 53 provides a movement of the lift frame 15 similar to a three-bar linkage due to the rigid connection between the piston 79 and the yoke 40, the pivot joint 82 between the lift device housing 80 and the angle bracket 83, and the pivot connections between the arms 86A, 88A and both the lift frame 15 and the yoke 40.

To raise the distal ends 36 of the forks 16, 18 simultaneously with lifting of the lift frame 15, a lift link assembly 84 (see FIG. 12) is provided. More specifically, the lift link assembly 84 includes the bell cranks 86, 88 connected at pin joints 90 to the yoke 40 and connected to each other with a counter-torque tube 92. The counter torque tube 92 restricts relative movement between the bell cranks 86, 88 and pivots about a shaft 94 rigidly connected to an upstanding housing 96 of the lift frame 15. In one approach, the counter-torque tube 92 is positioned on the shaft 94, the ends of the shaft 94 are positioned in openings 252 of the upstanding housing 96 (see FIG. 12), and the ends of the shaft 94 are welded to the housing 96.

The bell cranks 86, 88 each include a trailing arm 98 connected by a hinge 100 to a lift bar 102. Each lift bar 102 is in turn connected to a load roller assembly 104 which is pivotally connected to the lift frame 15 by shafts 106. Therefore, activating lift cylinder device 24 and shifting the housing 80 upward causes the lift frame 15 and shaft 94 fixed thereto to lift upward which pivots the bell cranks 86, 88 and counter torque tube 92 about the shaft 94, which in turn shifts the lift bars 102 forward in direction 108 and pivots the load roller assemblies 104 about the shafts 106 in direction 110 and raises forks 16, 18, as may be seen in FIG. 5.

Figure 5A:
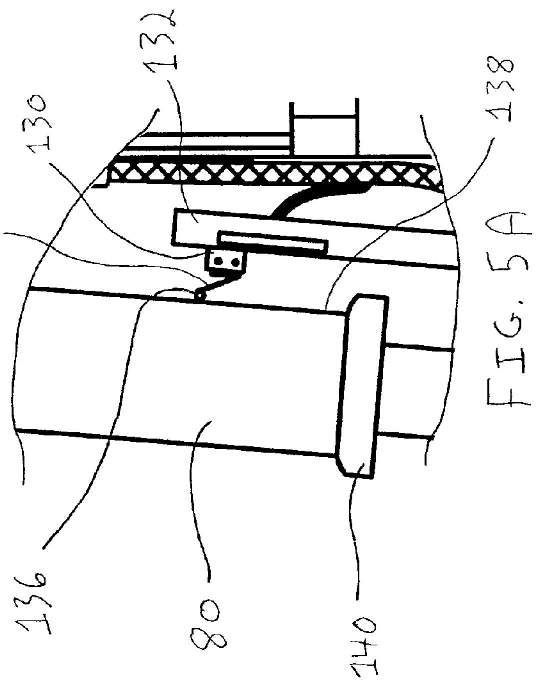
FIG. 5A is an enlarged side elevational view of the dashed circle portion of FIG. 5A showing a limit switch having a follower arm that travels along an outer surface of the lift cylinder device.
Figure 5:
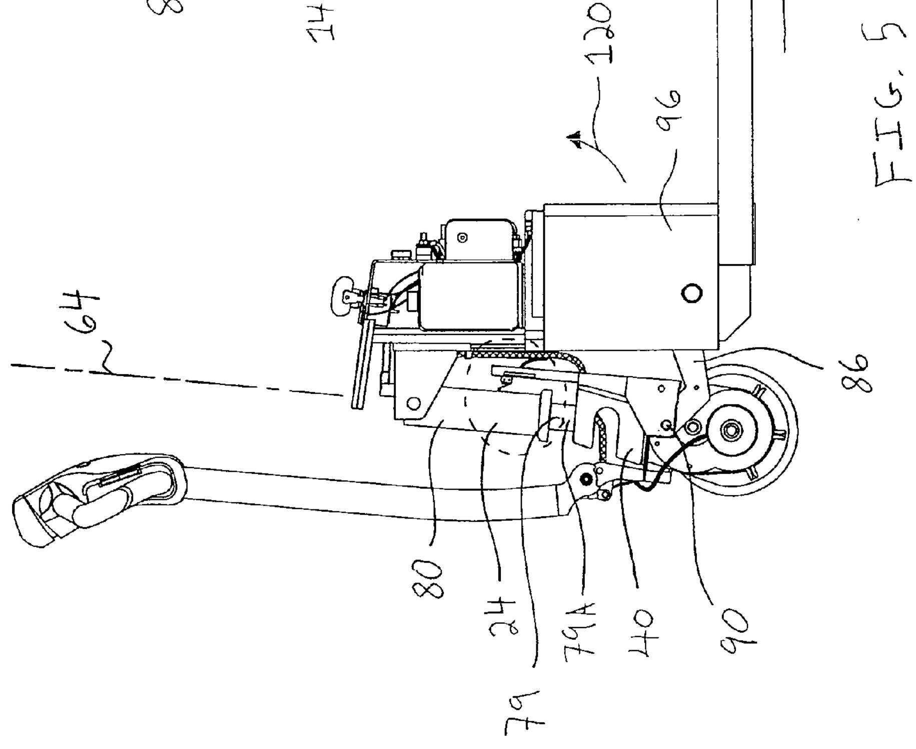
FIGS. 5 and 6 are side elevational views similar to FIG. 4 showing the lift cylinder device of the pallet truck lifting the lift frame upward away from the yoke and pivoting of the lift cylinder device relative to the lift frame.
Figure 6A:
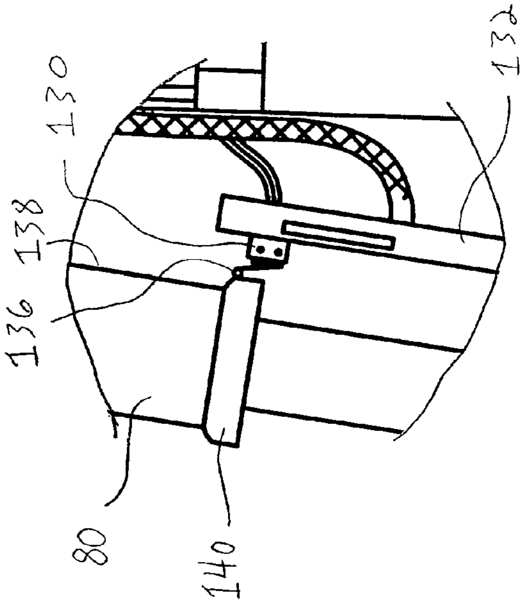
FIG. 6A is an enlarged side elevational view of the portion of the dashed circle portion of FIG. 6 showing the follower arm of the limit switch contacting a collar of the lift cylinder device and being shifted radially outward.
Figure 6:
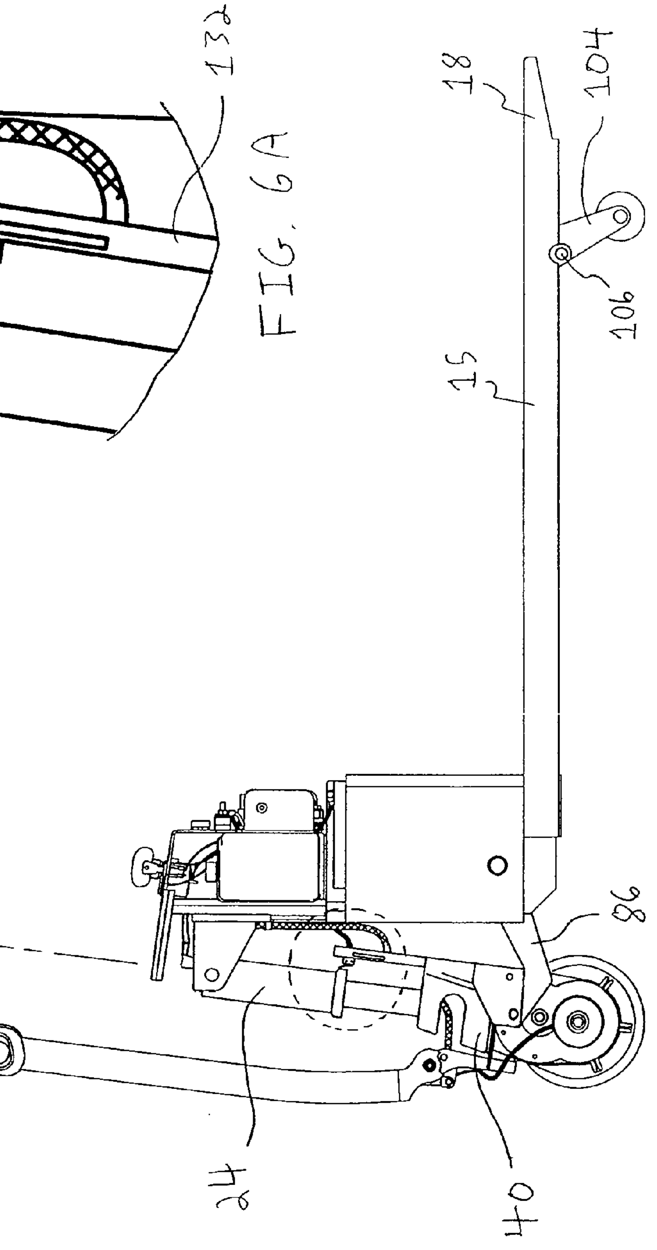

With reference to FIGS. 5A and 6A, the pallet truck 10 may include a limit switch 130 mounted on a bracket 132 connected to the yoke 40. The limit switch 130 includes a pivotal arm 134 and a roller 136 at a distal end thereof which rolls along an outer surface 138 of the lift cylinder device housing 80. As the housing 80 travels away from the yoke 40. Eventually, the roller 136 reaches a radially enlarged collar 140 of the housing 80 that shifts the roller 136 outward toward the bracket 132, as shown in FIG. 6A. At this point, the limit switch turns off a motor 142 of the pump 76 and limits the motor 142 from operating once the forks 16, 18 have reached the raised position 52. This restricts the motor 142 from drawing current when for example, an operator unintentionally holds down a "lift" button on a control head 156 of the steering assembly 46 (see FIG. 7) after the forks 16, 18 have reached the raised position 52. In one approach, the position of the collar 140 along the housing 80 may be adjustable to adjust the maximum height to which the lift frame 15 and forks 16, 18 thereof may be raised.

Figure 7:
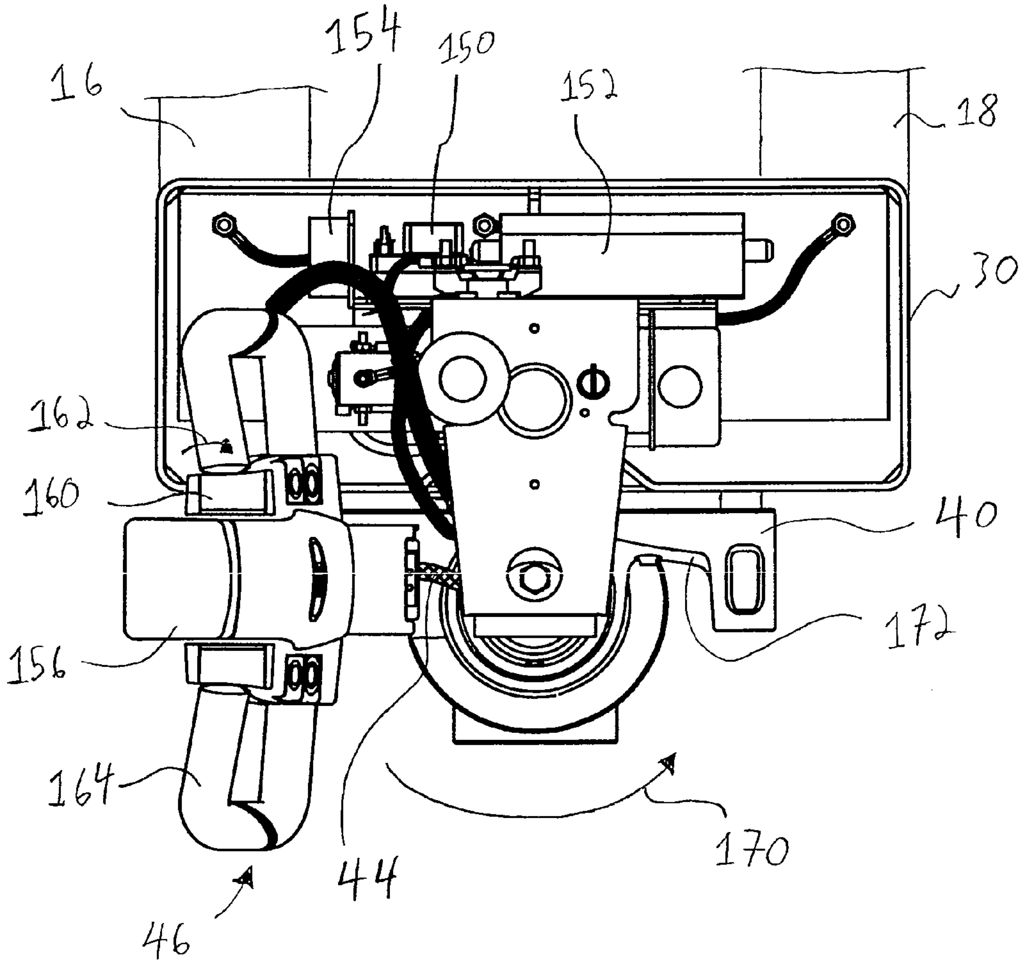
FIG. 7 is a top plan view of the pallet truck of FIG. 1 with the front and rear covers removed to show the steering assembly turned all the way to the left.

With reference to FIG. 7, the power head 30 includes a controller 150, a charger 152, and a fan 154 for providing air circulation beneath the front housing 60. The control head 156 receives inputs from an operator and converts the inputs into operation signals for the controller 150. In one form, the controller 150 is a Curtis® brand transistor speed control and the charger 152 is a 110V AC plug-in automatic charger. In response to signals from the control head 156, the controller 150 may send corresponding control signals to the drive motor 28 and/or the pump 76 and receive feedback from the drive motor 28 and/or the pump 76. For example, an operator may rotate paddle 160 forward in direction 162 which sends a signal to the controller 150 which in turn activates the drive motor 28 to propel the pallet truck 110 forward. The controller 150 then activates the drive motor 28 via one or more wires 151 (see FIG. 9) which are routed through the arcuate window 72.

To transmit the signals from the control head 156 to the controller 150, the wiring harness 44 extends from the control head 156, through arcuate window 42 of the yoke 40, and toward the lift frame 15, as shown in FIGS. 7 and 9. More specifically, the steering assembly 46 includes a handle 164 and a hinge bracket 166 (see FIG. 9) which travel around an arcuate wall 168 (see FIG. 14) of the yoke 40 when the handle 164 is turned in direction 170 from the left most position shown in FIG. 7. In the illustrated form, the yoke 40 includes a pair of stops 172, 174 configured to limit turning of the steering assembly 46.

Figure 8:
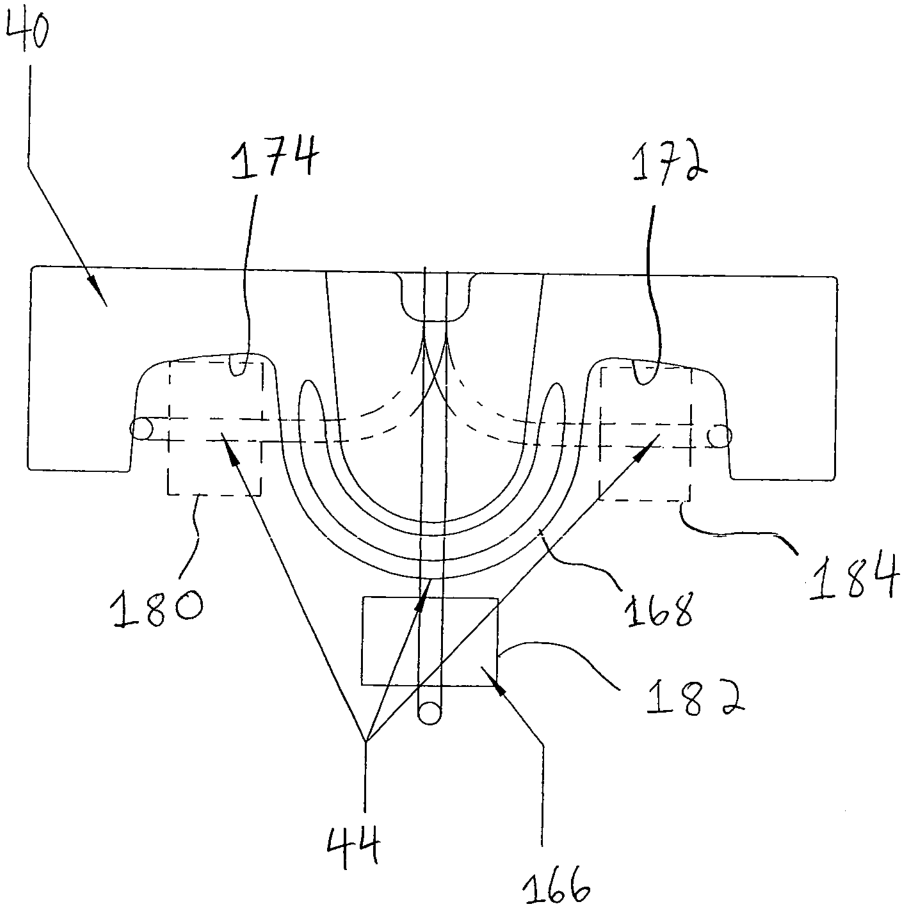
FIG. 8 is a simplified schematic view similar to FIG. 7 showing movement of the steering assembly relative to the yoke with turning of the steering assembly and concurrent movement of a wiring harness extending from the steering assembly toward the yoke.

With reference to FIG. 8, a simplified schematic view of the yoke 40, hinge bracket 166, and wiring harness 44 is shown. The simplified schematic view illustrates the hinge bracket 166 of the steering assembly 46 at a left most position 180, a central position 182 wherein the hinge bracket 166 is aligned with the central longitudinal axis 32 of the pallet truck 10, and a right most position 184. The yoke 40 may include a pair of stops 172, 174 configured to limit turning of the steering assembly 46, such as by restricting turning of the hinge bracket 166 and associated steering assembly 46. Although simplified, FIG. 8 illustrates the movement of the hinge bracket 166 and wiring harness 44 throughout the full range of turning of the steering assembly 146, which is in one form approximately 180 degrees. As will be discussed in greater detail below, the arcuate window 42 of the yoke 40 permits the wiring harness 44 to move from left most position 180 to right most position 184 without flexing or kinking of the wiring harness 44.

As shown in FIG. 9, the power head 30 has a compact, stacked configuration with one or more batteries 190 received within the upstanding housing 96 of the lift frame 15 and the hydraulic pump 76 positioned above the batteries 190. In one form, the one or batteries may be 24-volt 65 amp-hour absorbed glass mat maintenance-free batteries. The hydraulic pump 76 may be positioned in a generally horizontal orientation, as shown in FIG. 9, above the one or more batteries 190 to lower the center of gravity of the power head 30. The power head 30 further includes the lift cylinder device 24 aligned in the fore-and-aft direction above the drive wheel 26 and the drive motor 28 along the central longitudinal axis 32 of the pallet truck 10. In this manner, the relatively heavy drive motor 28 is low to the ground which further lowers the center of gravity of the power head 30 while minimizing its longitudinal length 43 (see FIG. 3).

Another advantage of the pallet truck 10 is that the steering assembly 46 includes a relatively long control arm 192 connected to a gear box housing 194 (see FIG. 15) at the hinge bracket 166 below the yoke 40. Connecting the control arm 192 to the gear box 194 below the yoke 40 permits the length of the control arm 192 to be sized to provide an optimal amount of mechanical advantage to assist in turning of the drive wheel 26 and drive motor 28 mounted therein. Further, the connection between the hinge bracket 166 and the control arm 192 is approximately vertically aligned with the arcuate window 42 of the yoke 40. This provides an unobstructed path for the wiring harness 44 to extend from a lower section 193 of the control arm 192, into the arcuate window 42 of the yoke 40, out from an opening 200 (see FIG. 16) in a front wall 202 of the yoke 40, and toward the lift frame 15.

Figure 10:
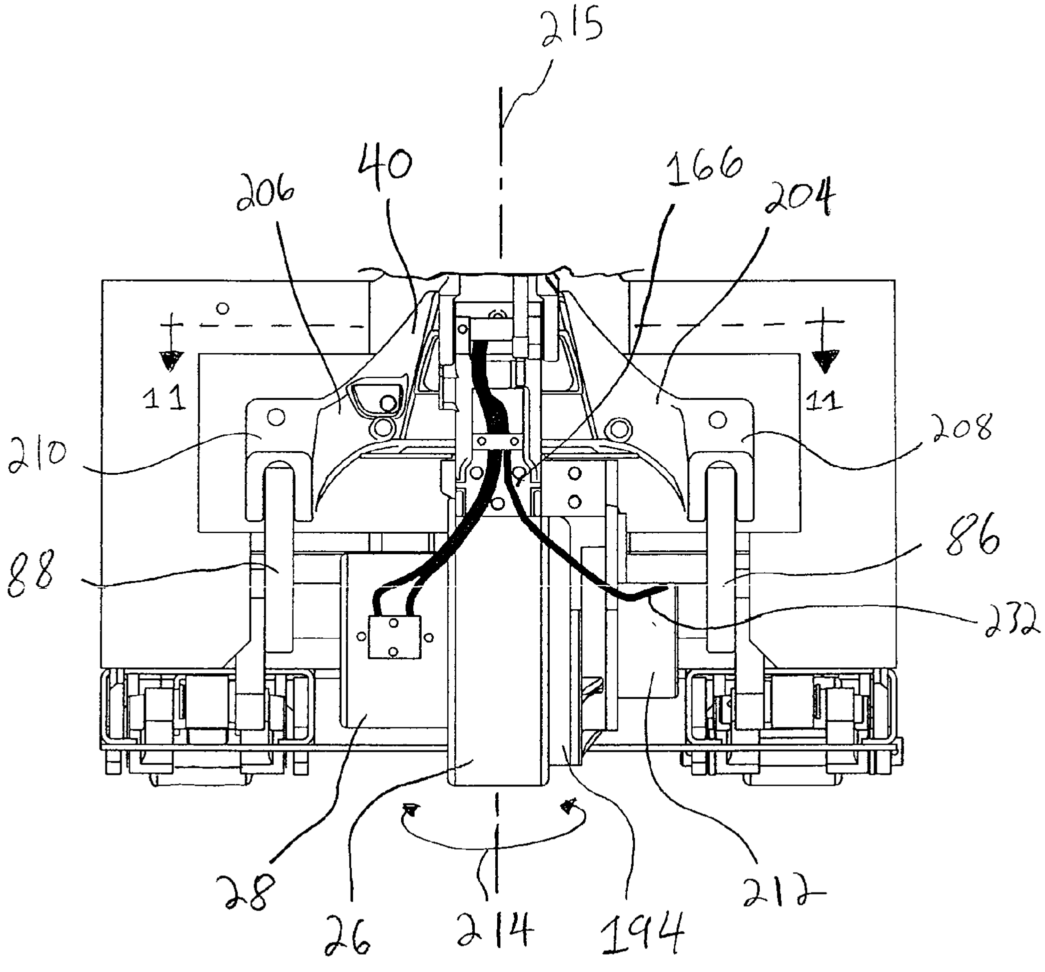
FIG. 10 is a partial rear elevational view of the pallet truck of FIG. 1 with the rear cover removed showing the drive motor and drive wheel positioned below the yoke.

With reference to FIG. 10, the drive wheel 26, drive motor 28, and gear box housing 194 are shown disposed below the yoke 40 and between bell cranks 86, 88. The yoke 40 has laterally extending arms 204, 206 extending away from the center of the yoke 40 which position link portions 208, 210 of the yoke 40 and the bell cranks 86, 88 pivotally connected thereto a predetermined distance laterally from the drive wheel 26. As such, the yoke 40 and bell cranks 86, 88 provide clearance for pivoting of the drive wheel 26, drive motor 28, and an electric brake 212 attached to the gear box housing 194 with turning of the steering assembly in direction 214 about steering axis 215.

Figure 11:
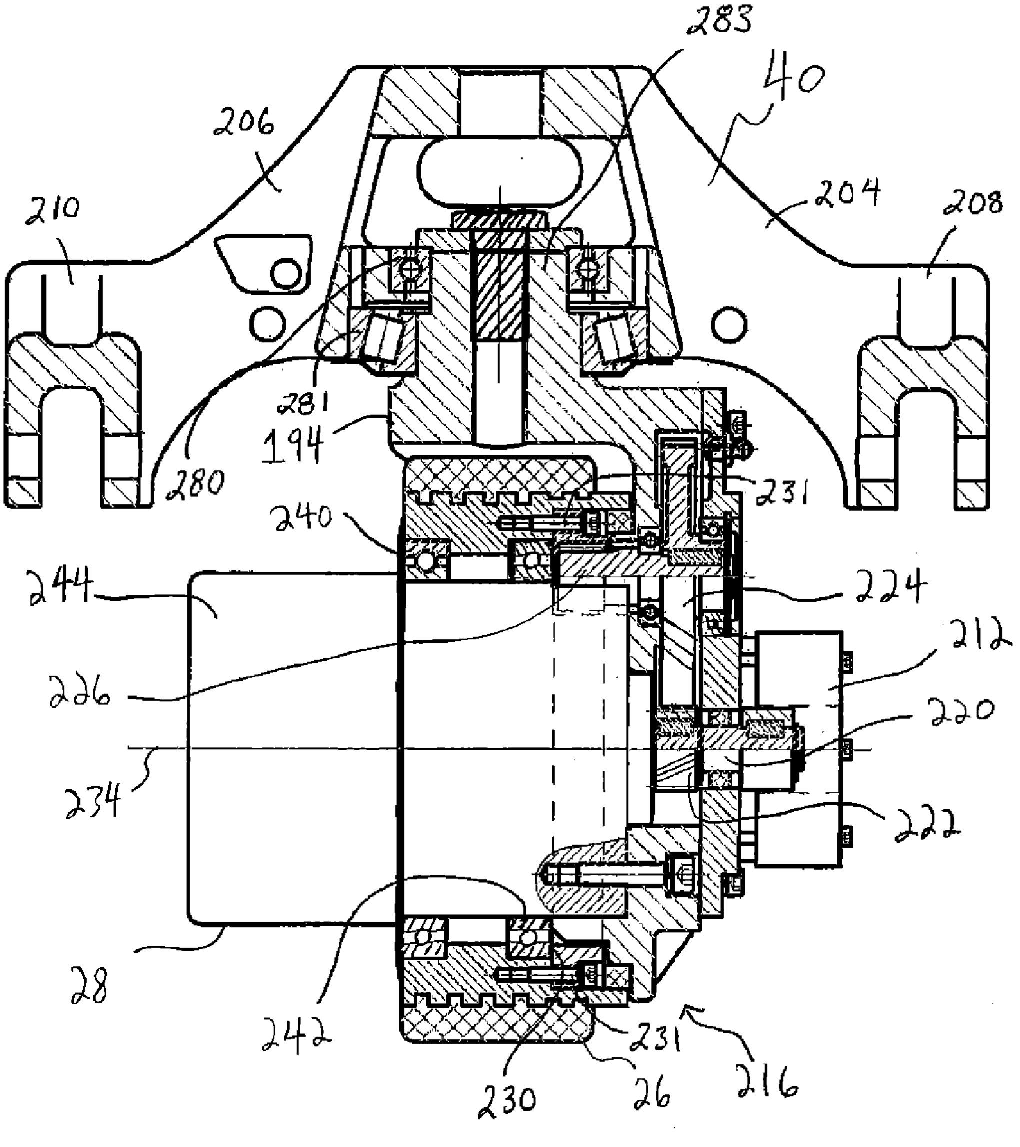
FIG. 11 is a partial cross sectional view taken across the center of the drive wheel along FIG. 11-11 in FIG. 10 showing the drive motor extending through the center of the drive wheel.

The pallet truck 10 has a transmission assembly 216 that transfers rotation of a driveshaft 220 of the drive motor 28 disposed within the drive wheel 26 into rotation of the drive wheel 26. More specifically, the drive motor 28 is mounted in the drive wheel 26 so that the drive wheel 26 extends about the drive motor 28, as shown in the cross-sectional view of FIG. 11. The drive motor 28 has a drive shaft 220 concentrically aligned with an axis of rotation 234 of the drive wheel 26 so that the drive wheel 26 spins about the drive motor 28 and shaft 220 thereof. A drive gear 222 is disposed on the drive shaft 220 and fixed thereto by a key 223. Rotation of the drive shaft 220 produces rotation of drive gear 22 which drives a driven gear 224 fixed to a pinion gear 226 (see FIG. 15) by key 227. The pinion gear is engaged with a ring gear 228 fixed to an annular surface 230 of the drive wheel 26 (see FIG. 15) by fasteners 231. With reference to FIGS. 10 and 11, the electric brake 212 is connected to the controller 150 by one or more wires 232 which are routed through the arcuate window 42 of the yoke 40. The electric brake 212 is coupled to the drive shaft 220 and permits rotation of the drive shaft 220 when electric current is supplied to the electric brake 212 via the one or more wires 232. When the electric current is removed, the electric brake 212 brakes the drive shaft 220 and thereby directly slowing rotation of the drive shaft 220 and indirectly slowing the drive wheel 26 by way of the gears 222, 224, 226, and 228.

Figure 15:
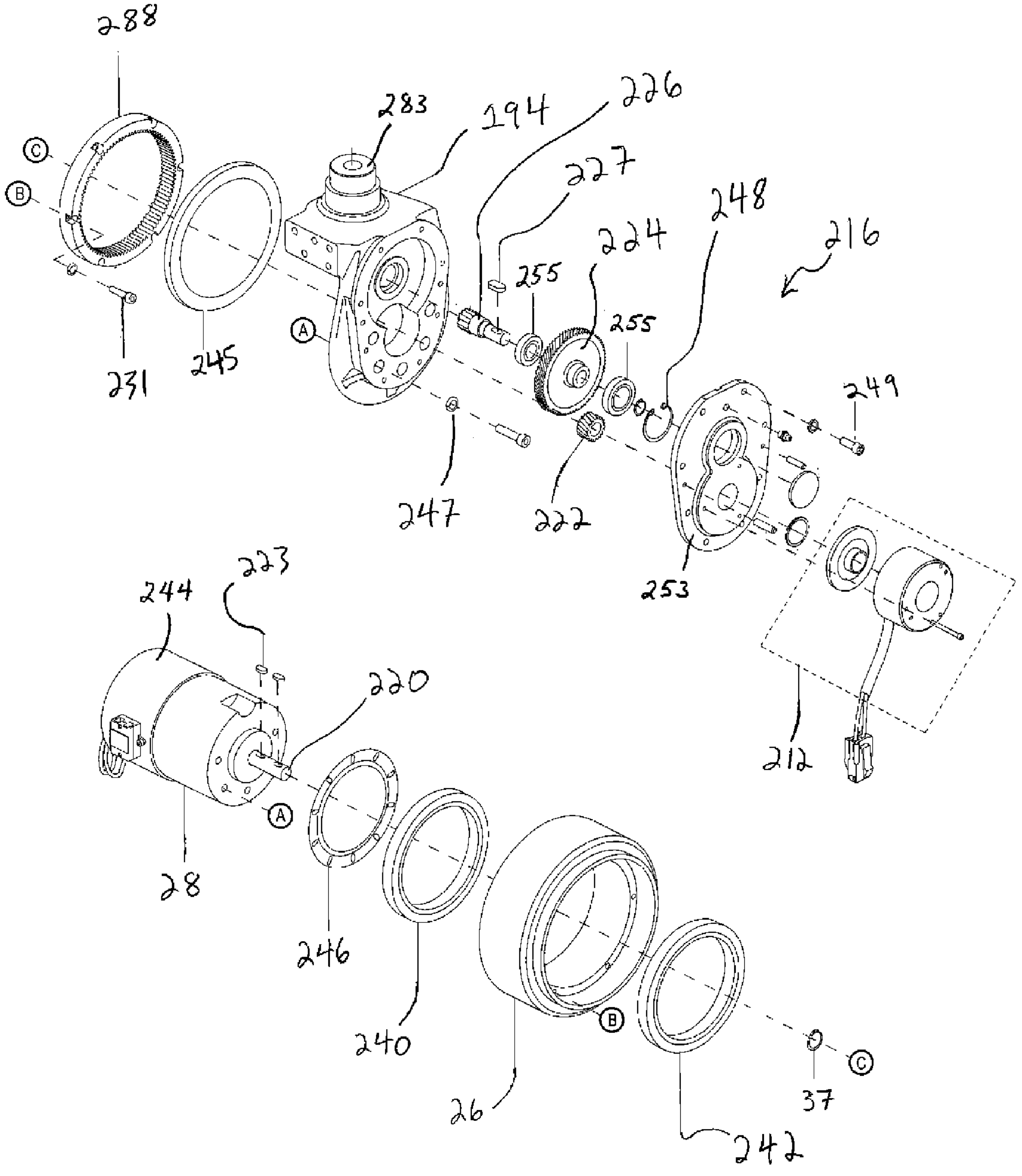
FIG. 15 is an exploded view of the transmission assembly, drive motor, and drive wheel of the pallet truck of FIG. 1.

With continued reference to FIG. 15, bearings 240, 242 are disposed concentrically about a housing 244 of the drive motor 28 and permit rotation of the drive wheel 26 about the drive motor 28. The transmission assembly 216 may further include an oil seal 245, a retainer 246, washers 247, clips 248, fasteners 249, bearings 255, and a cover 253 to retain the components of the transmission assembly 216 and permit operation thereof, as will be appreciated by one of skill in the art.

Figure 12:
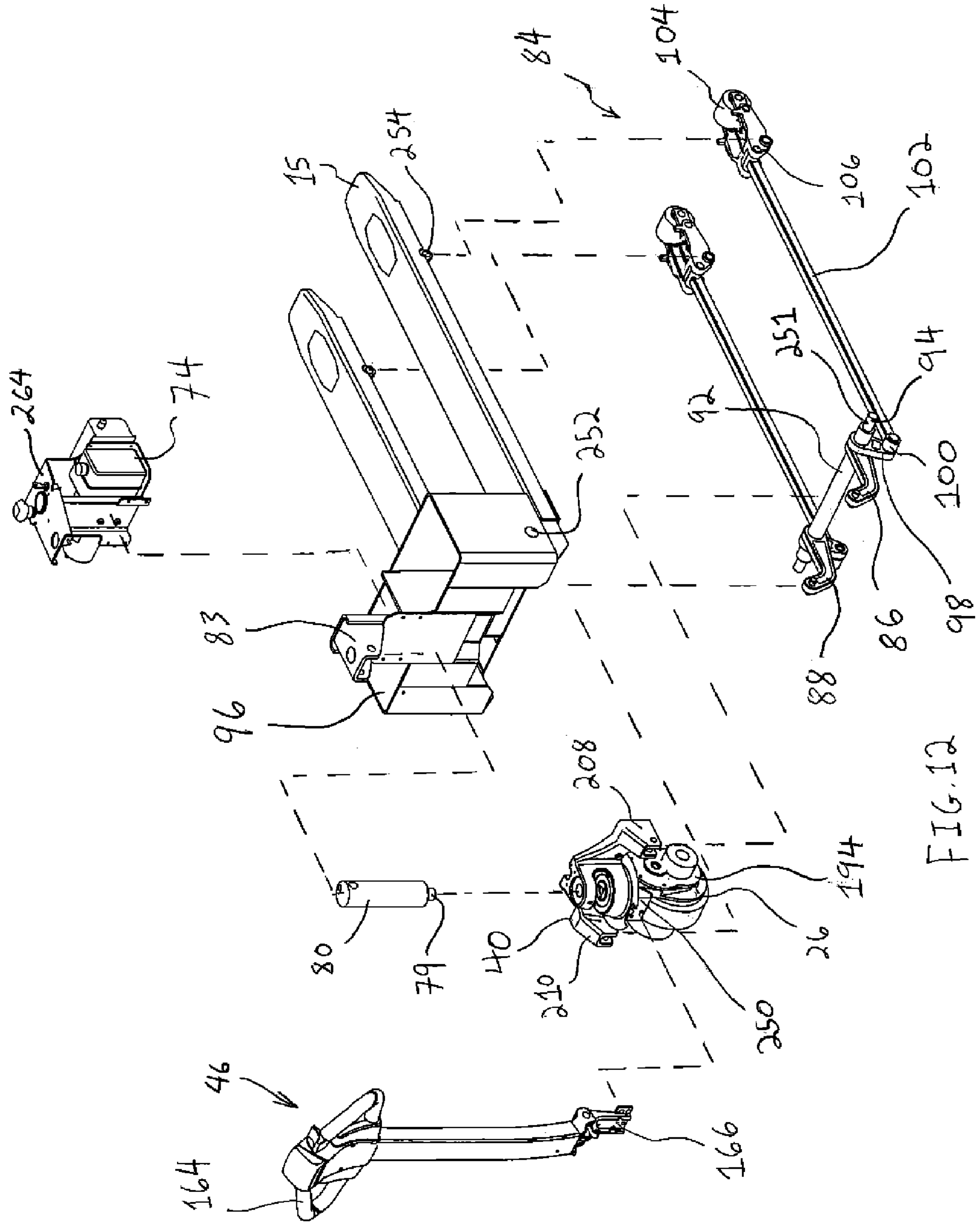
FIG. 12 is an exploded view of several major portions of the pallet truck of FIG. 1 including the lift frame, the lift cylinder device, the yoke, the steering assembly, a transmission assembly, a hydraulic system assembly, and a lift link assembly.

With reference to FIG. 12, several components of the pallet truck 10 are shown in an exploded configuration with dash lines indicating the connections between the different components. More specifically, the hinge bracket 166 of the steering assembly 46 bolts onto a rear face 250 of the gear box housing 194 to permit turning of the drive wheel 26 and drive motor 28 with turning of the handle 164. On either side of the drive wheel 26, the link portions 208, 210 of the yoke 40 are pivotally connected to the bell cranks 86, 88 of the lift link assembly 84. Further, an end 251 of the shaft 94 is received within the opening 252 of the lift frame 15 and may be welded or otherwise secured therein. Further, the shafts 106 of the load roller assemblies 104 are connected to mounts 254 of the forks 16, 18 of the lift frame 15.

Figure 13:
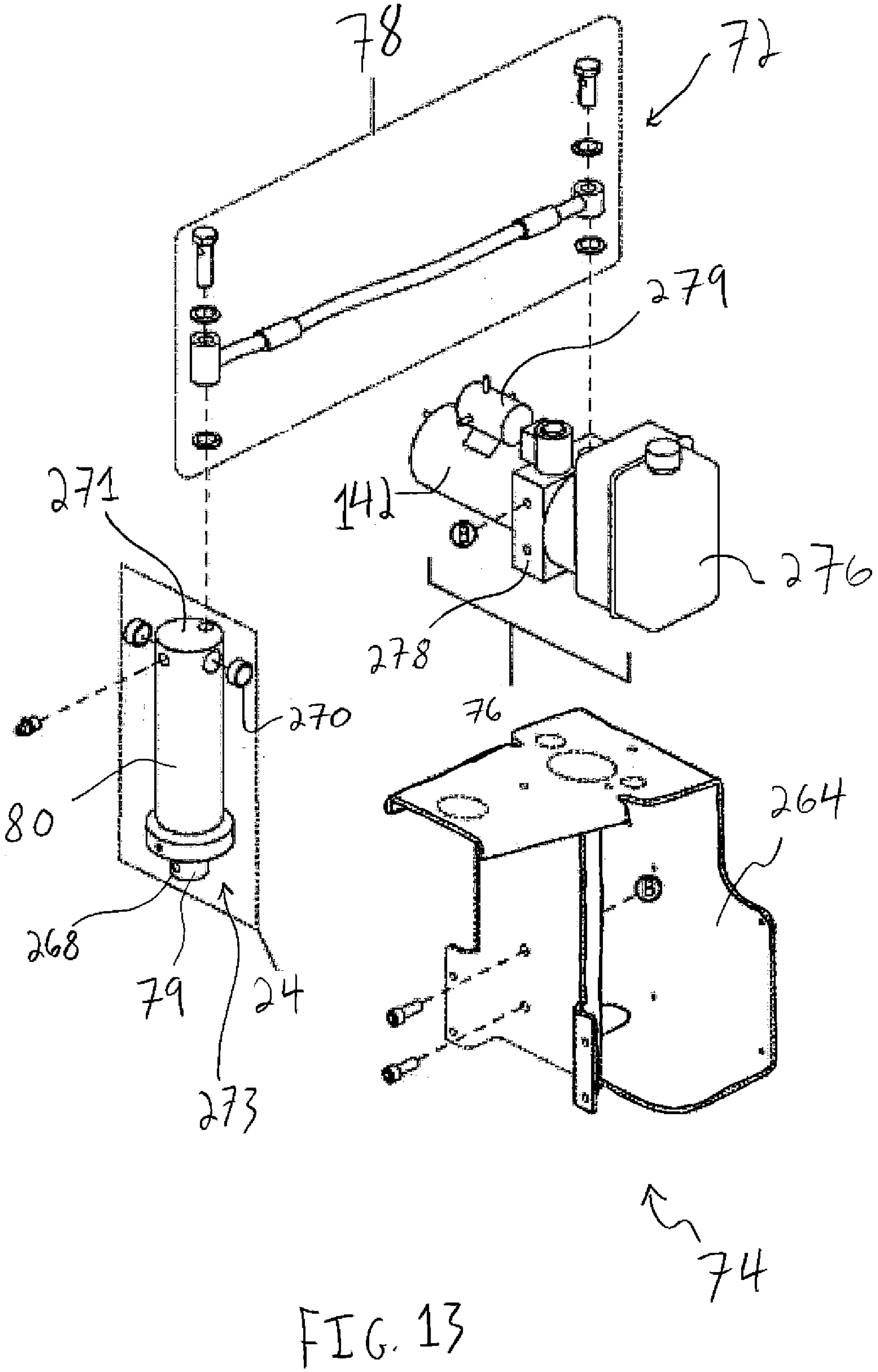
FIG. 13 is an exploded view of the hydraulic system assembly of the pallet truck of FIG. 1.

At the other end of the lift frame 15, the hydraulic system assembly 74 is secured to the upstanding housing 96. The upper portion of the lift cylinder device 24 is pivotally connected to the lift frame 15 at angle bracket 83 and rigidly connected at the lower portion of the lift cylinder device 24 to a lift cylinder device seat 262 (see FIG. 14) of the yoke 40. The pivot joint 82 (see FIG. 4) between the angle bracket 83 and the housing 80 may include bushings 270 to provide pivoting between the housing 80 and the angle bracket 83. With reference to FIG. 13, the housing 80 has an upper closed end 271 and a lower end opening 273 from which the piston 79 reciprocates in and out from during operation of the lift cylinder device 24. The lift cylinder device 24 includes a gland adjacent the lower end opening 273 which provides sealing of the lift cylinder device 24. In one form, the piston 79 of the lift cylinder device 24 is received within an opening 260 of the lift cylinder device seat 262 and fixed therein with a set screw inserted through opening 266 in the lift cylinder device seat 262 and engaged with a threaded bore 268 in the piston 79 (see FIGS. 13 and 14).

The hydraulic system assembly 74 may include the lift cylinder device 24, the hose 78, the pump 76, and a support 264 to which the pump 76 is mounted. The pump 76 includes a motor 142 for pumping fluid from a reservoir 276 toward the lift cylinder device 24 through hose 78. In contrast to prior manual or semi-powered pallet trucks, the hydraulic system assembly 74 is configured to operate the lift cylinder device 24 without pivotal pumping of the handle 164. In one form, the drive motor 28 and the pump motor 142 may both be permanent magnet direct current motors which provides efficient operation, extended battery capacity, and improved duty cycles for the pallet truck 10. The pump 76 also includes a valve 278 for controlling flow of the fluid and a solenoid 279 to control operation of the valve 278.

The gear box housing 194 is rotatably coupled to a steering seat 284 of the yoke 40 so that the transmission assembly 216, drive wheel 26, and drive motor 28 may be turned relative to the yoke 40 about the steering axis 45 (see FIG. 2). More specifically, the gear box housing 194 has a steering shaft 283 disposed in an opening 282 of the yoke steering seat 284 and bearing assemblies 280, 281 support the shaft 283 within the opening 282 (see FIGS. 14 and 15).

Figure 16:
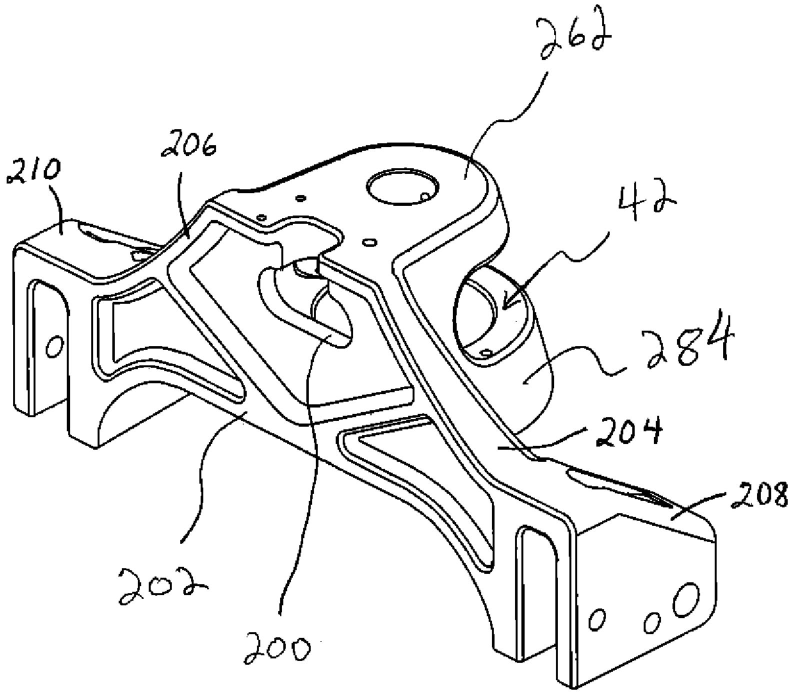
FIG. 16 is a perspective view of the yoke of the pallet truck of FIG. 1 showing an opening in a front wall of the yoke in communication with the arcuate window.
Figure 17:
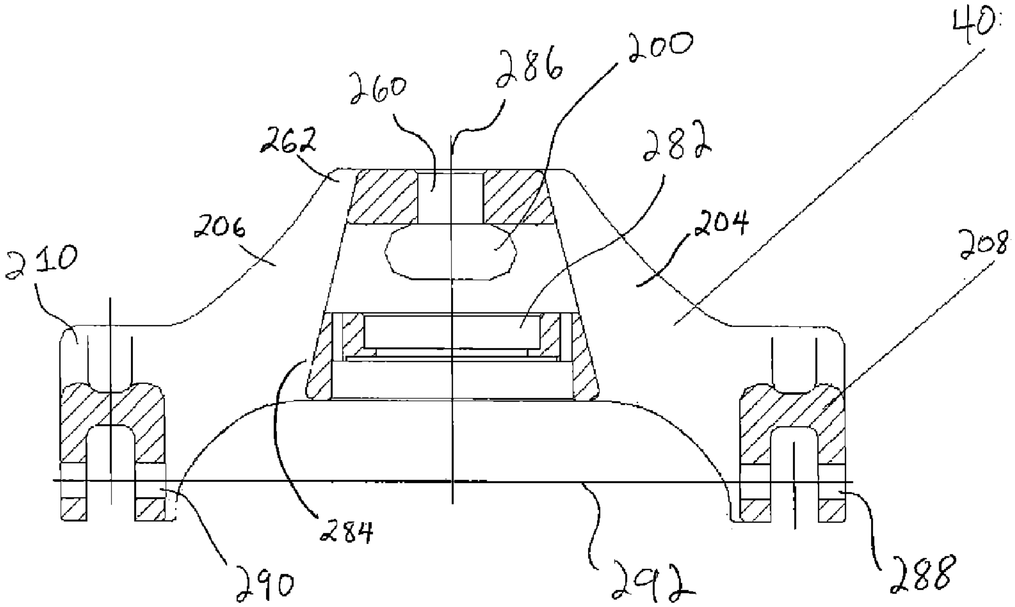
FIG. 17 is a cross-sectional view of the yoke of FIG. 14 taken across line 17-17 in FIG. 14 showing an opening of the yoke for receiving a piston of the lift cylinder device positioned above the acruate window and an opening of the yoke for receiving the steering assembly positioned below the acruate window.

With reference to FIGS. 16 and 17, the lift cylinder device seat 262 and the steering seat 284 are positioned on opposite sides of the arcuate window 42 with the respective openings 260, 282 aligned along a common axis 286. Further, the link portions 208, 210 have pairs of through openings 288, 290 through which pins are received to form pin joints 90 with the bell cranks 86, 88. The pairs of through openings 288, 290 are aligned along a common axis 292. Although the yoke 40 is illustrated as being an integral piece, it may also comprise multiple components.

It will be understood that various changes, modifications, alterations, and combinations in the details, materials, and arrangements of the parts and components that have been described and illustrated in order to explain the nature of the powered pallet truck as described herein may be made by those skilled in the art within the principle and scope of this disclosure.

What is claimed is:

1. A powered pallet truck comprising:

a frame assembly having a base support portion and a load lift portion;

the base support portion including a lift cylinder device seat spaced from and above a steering seat, and the load lift portion of the frame assembly including a pair of forks which extend forwardly of the base support portion;

a rear drive wheel coupled to the base support portion and being disposed rearward of the load lift portion;

the forks each having a distal forward end coupled to at least one ground-engaging load roller assembly;

a drive motor coupled to the drive wheel;

a steering assembly rotatably coupled to the steering seat; and a lift cylinder device fixedly connected at a lower end to the lift cylinder device seat and pivotally coupled at an upper end to the load lift portion, wherein the lift cylinder device is extendible and retractable.

2. The powered pallet truck of claim 1 wherein the base support portion includes a window disposed between the lift cylinder device seat and the steering seat.

3. The powered pallet truck of claim 1 wherein the drive motor is mounted in the drive wheel.

4. The powered pallet truck of claim 1 wherein the drive wheel is rotatably coupled to the base support portion about a first axis of rotation that is a drive axis about which the drive wheel is driven, and wherein the drive wheel is rotatably coupled to the base support portion about a second axis of rotation that is a steering axis about which the drive wheel is steered.

5. The powered pallet truck of claim 1 wherein the drive wheel is coupled to a gear box housing having a steering shaft.

6. The powered pallet truck of claim 5 wherein the steering shaft is rotatably coupled to the base support portion by first and second bearing assemblies.

7. The powered pallet truck of claim 6 wherein the first bearing assembly is of ball bearing configuration.

8. The powered pallet truck of claim 6 wherein the second bearing assembly is of a tapered roller bearing configuration.

9. The powered pallet truck of claim 6 wherein the first and second bearing assemblies are spaced from and below the lift cylinder device seat.

10. The powered pallet truck of claim 6 wherein the second bearing assembly is spaced from and below the first bearing assembly.

11. The powered pallet truck of claim 6 wherein the first and second bearing assemblies have a diameter and the diameter of the second bearing assembly is larger than the diameter of the first bearing assembly.

12. The powered pallet truck of claim 1 wherein the lift cylinder device leans forward when it is extended.

13. The powered pallet truck of claim 12 wherein as the lift cylinder device is extending and leaning forward, a portion of a load on the drive wheel is transferred from being supported by the drive wheel to being supported by the load roller assemblies.

14. The powered pallet truck of claim 1 further comprising at least two bell cranks, wherein each bell crank is pivotally coupled at a rear end to the base support portion and pivotally coupled at a forward end to the load lift portion.

15. The powered pallet truck of claim 14 wherein each load roller assembly is pivotally coupled to a fork and each bell crank is further coupled to one of the load roller assemblies.

16. The powered pallet truck of claim 15 wherein each bell crank is coupled to one of the load roller assemblies by having each bell crank pivotally coupled to a rear end of a lift bar that has a forward end pivotally coupled to one of the load roller assemblies.

17. The powered pallet truck of claim 16 wherein when the lift cylinder device is extended, the load lift portion is raised at the coupling of the load lift cylinder to the load lift portion and at the coupling of the load roller assemblies to the forks.

18. The powered pallet truck of claim 17 wherein when the lift cylinder device is extended the lift cylinder device leans forward and a portion of a load on the drive wheel is transferred from being supported by the drive wheel to being supported by the load roller assemblies.

19. The powered pallet truck of claim 12 wherein when the lift cylinder device is extended, the coupling of the lift cylinder device to the base support portion and to the load lift portion, in combination with the coupling of the bell cranks to the base support portion, the load lift portion and the load roller assemblies, causes pivotal movement of the bell cranks resulting in movement of the lift bars and pivoting of the load roller assemblies so as to raise the forks.

20. The powered pallet truck of claim 1 wherein the upper end portion of the lift cylinder device includes a housing having a closed upper end and a lower end opening and the lower end portion of the lift cylinder device includes a piston which reciprocates into and out of the lower end opening of the housing during operation of the lift cylinder device.

21. The powered pallet truck of claim 1 wherein the lift cylinder device is in fluid communication with a pressurized fluid supply mechanism that is mounted to the load lift portion and that remains substantially stationary relative to the load lift portion during up and down movement of the load lift portion.

22. The powered pallet truck of claim 21 wherein the fluid communication between the lift cylinder device and the pressurized fluid supply mechanism further comprises a fluid conduit between the upper end of the lift cylinder device and the pressurized fluid supply mechanism.

23. The powered pallet truck of claim 1 further comprising:

an arcuate window in the base support portion;

a controller mounted to the load lift portion;

a control head connected to the steering assembly for receiving manual inputs from an operator of the pallet truck and converting the inputs into operation signals;

one or more cables operably connecting the control head of the steering assembly to the controller mounted to the load lift portion; and wherein the arcuate window is sized and configured to receive the one or more cables extending therethrough with the arcuate window permitting movement of the one or more cables within the arcuate window as the steering assembly is turned relative to the base support portion.

24. The powered pallet truck of claim 1 wherein the base support portion further comprises a yoke of integral construction.

* * * * *